United States Patent [19]
Eberhardt

[11] Patent Number: 5,101,361
[45] Date of Patent: Mar. 31, 1992

[54] ANALOG HARDWARE FOR DELTA-BACKPROPAGATION NEURAL NETWORKS

[75] Inventor: Silvio P. Eberhardt, Pasadena, Calif.

[73] Assignee: The United States of America as represented by the Administrator of the National Aeronautics and Space Administration, Washington, D.C.

[21] Appl. No.: 414,811

[22] Filed: Sep. 29, 1989

[51] Int. Cl.[5] ............................................. G06G 7/12
[52] U.S. Cl. .................................... 395/24; 364/807; 307/201
[58] Field of Search ...................... 364/513, 602, 807; 307/201

[56] References Cited

U.S. PATENT DOCUMENTS

| | | | |
|---|---|---|---|
| 3,638,196 | 1/1972 | Nishiyama et al. | 340/172.5 |
| 4,782,460 | 11/1988 | Spencer | 364/807 |
| 4,839,700 | 6/1989 | Ramesham et al. | 357/2 |
| 4,866,645 | 9/1989 | Lish | 364/602 |
| 4,906,865 | 3/1990 | Holler | 307/353 |
| 4,945,257 | 7/1990 | Marrocco | 307/201 |
| 4,951,239 | 8/1990 | Andes et al. | 364/807 |
| 4,953,928 | 9/1990 | Anderson et al. | 357/23.5 |
| 4,961,005 | 10/1990 | Salam | 307/201 |
| 4,969,021 | 11/1990 | Thakoor et al. | 357/23.5 |

OTHER PUBLICATIONS

Rumelhart, Hinton, and Williams (Chapter 8, vol. 1, *Parallel Distributed Processing* Rumelhart & McClelland, eds. MIT Press, 1986).

Lippmann, Richard P., "An Introduction to Computing with Neural Nets", *IEEE ASSP Magazine*, Apr. 1987, pp. 4–21.

Rumelhart et al., "Learning Internal Representations by Error Propagation", *Parallel Distributed Processing, Explorations in the Microstructure of Cognition*, vol. 1: *Foundations*, MIT Press, 1986, pp. 318–362.

*Primary Examiner*—Allen R. MacDonald
*Assistant Examiner*—Roger S. Joyner
*Attorney, Agent, or Firm*—Thomas H. Jones; Harold W. Adams; John R. Manning

[57] ABSTRACT

This is a fully parallel analog backpropagation learning processor which comprises a plurality of programmable resistive memory elements serving as synapse connections whose values can be weighted during learning with buffer amplifiers, summing circuits, and sample-and-hold circuits arranged in a plurality of neuron layers in accordance with delta-backpropagation algorithms modified so as to control weight changes due to circuit drift.

14 Claims, 4 Drawing Sheets

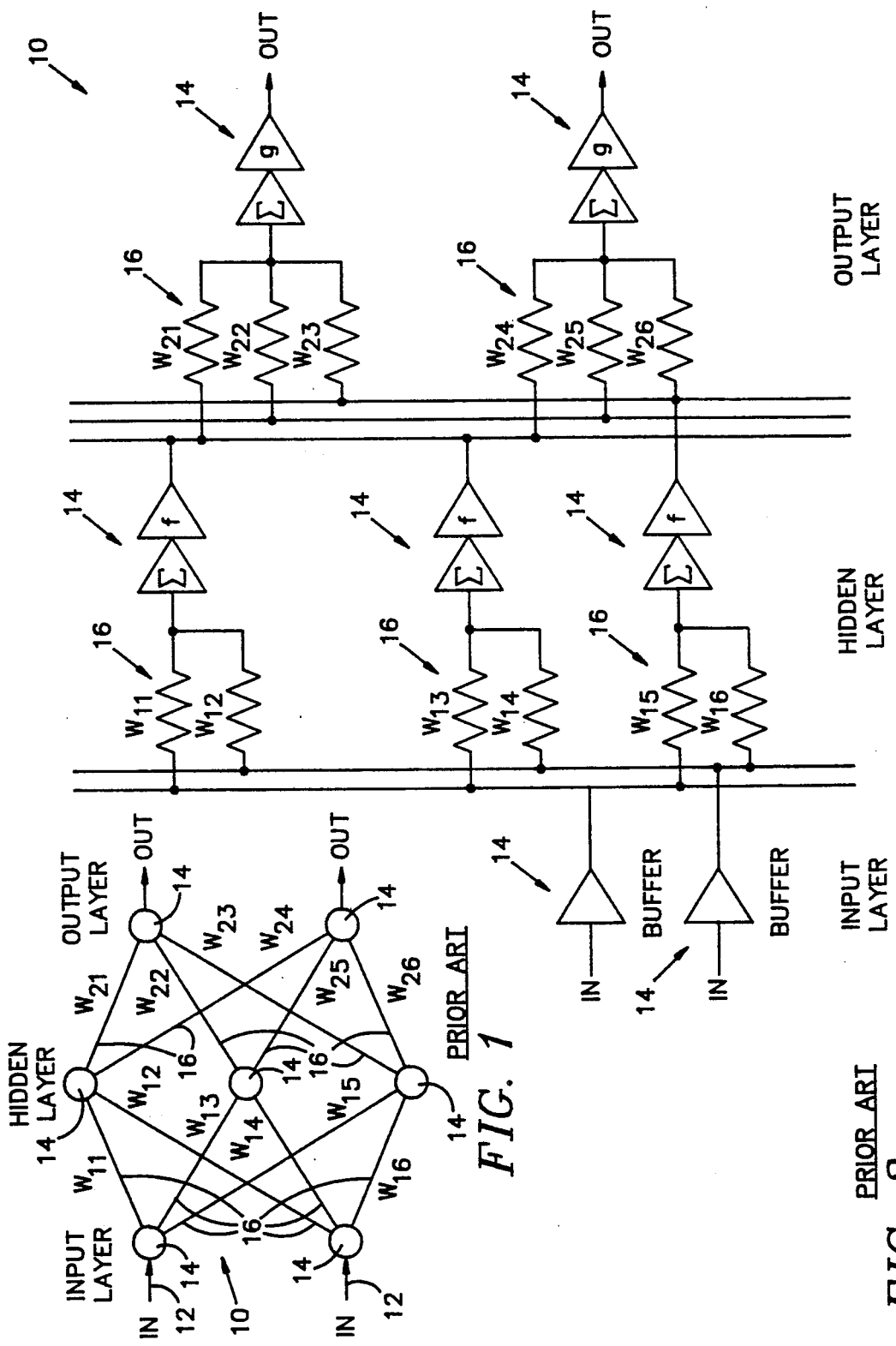

ANALOG HARDWARE FOR DELTA-BACKPROPAGATION NEURAL NETWORKS

ORIGIN ON THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to neural computing networks and, more particularly, in a neural computing network comprising at least three layers extending between at least one input at a first layer and at least one output at a third layer and comprising a plurality of neuron computational nodes interconnected by a plurality of synapse connections providing adjustably weighted paths between the neuron computational nodes, to the method of connection and operation for teaching the network comprising the steps of, prior to teaching, including at least one programmable resistive memory element representing the weight to be accorded the associated synapse connection in each of the synapse connections and, at the time of teaching, applying a known input value to the input of the neural computing network, calculating error signals representing the difference between an actual output value from each neuron computational node having a synapse connection as an input thereto and a target output value in response to the known input value applied to the input of the neural computing network, and adjusting the programmable resistive memory element of each of the synapse connections according to a modified delta-backpropagation algorithm as a function of an associated one of the error signals wherein backpropagation is serially performed one layer at a time with the final layer being adjusted first.

In the preferred embodiment, the step of adjusting the programmable resistive memory element of each of the synapse connections according to a modified delta-backpropagation algorithm comprises the steps of, performing feedforward on one element of a training set; calculating an error signal which is the difference between an actual output and a desired target value; multiplying the error signal by a feedforward activation value weighted by the derivative of an output activation function; for each programmable resistive memory element that is connected to an output neuron computational node, multiplying the error signal with the output of the previous layer neuron computational node; and, using the resultant product from the preceding step to adjust the weight represented by the associated programmable resistive memory element by a small increment.

In one embodiment, the error signal is backpropagated through the output layer and through a second layer and the method additionally comprises the steps of, after said step of performing feedforward on one element of a training set, storing the error signal in a sample and hold apparatus and then physically switching the output layer synapse connections from a feedforward position to a backpropagation network to thus disable feedforward operation.

Also in the preferred embodiment, the method additionally comprises the step of physically switching the synapse connections between a first or "top" position wherein each synapse connections is in a feedforward position, a second or "center" position wherein the synapse connection is reprogrammed based on the back-propagated error signal and the activation of the previous layer neuron, a third or "bottom" position wherein the synapse connections are used to form the back-propagated error signal required to reprogram synapse connections in earlier layers. Additionally, there is the step of applying a threshold to a backpropagated error signal and not updating the programmable resistive memory element of each of the synapse connections if the backpropagated error signal is below the threshold. Preferably, the threshold is set to a maximum expected offset error whereby uncontrolled weight inflation associated with the programmable resistive memory elements cannot occur. The preferred method also includes the step of adjusting each of the programmable resistive memory elements an amount representing a very small fixed weight change in a direction that tends to cause a change of state in the neuron computational node following a programmable resistive memory element when the backpropagated error signal is below the threshold whereby learning precision of the neural computing network is improved.

The preferred method also includes the steps of, prior to teaching, including at least two programmable resistive memory elements in each of the synapse connections representing the weight to be accorded the associated synapse connection and, at the time of teaching, applying a positive signal through one of the programmable resistive memory elements to represent excitation and applying a negative signal through another of the programmable resistive memory elements to represent inhibition.

BACKGROUND ART

In the field of computing hardware used for processing data in an environment such as fault-tolerant learning machines, autonomous control, pattern matching, artificial intelligence, robotics, etc., much excitement has been generated by neural network models that have the capability to learn. One particular model, delta-backpropagation (DB), has been successfully taught to perform a wide variety of tasks. DB shows promise for rapidly performing tasks that traditionally require great computational resources (e.g., image processing, pattern completion, and searching), because its neural network algorithm consists of many simple processing elements all working in parallel rather than one central processing element (i.e. the computer) working in a serial fashion as occurs in other forms of computing.

To date, all DB studies have been accomplished in a simulated environment using serial computers, or computers with a limited number of parallel processors. Thus DB has not actually been used for such high powered applications in normal and everyday use as would be desirable. In such simulated environments, digital computers are programmed to simulate the neural network DB algorithm. Consequently, the speed advantage inherent in the DB model is lost and simulation studies may take days or even weeks to run. A fully parallel hardware implementation is necessary for determining the utility of DB in solving large-scale computationally-intensive problems. Furthermore, the DB elements must be implemented in VLSI technology in order to make feasible a system with great numbers of parallel elements.

A fully parallel hardware implementation may take the form of analog circuitry, digital circuitry, or a hybrid of the two. While a digital implementation may hold the advantage of higher precision with respect to mathematical computations, an analog system may be significantly simpler in terms of number of transistors and, consequently, more processing elements may fit onto a VLSI chip of a given area. The problem then is how to implement the delta backpropagation algorithm in an analog hardware form that lends itself to implementation in VLSI.

Essentially being modeled after the human brain, neural networks generally consist of a number of simple processing elements, called "neurons", that are connected by conductive elements called "synapses". The conductance of the synapses are continuously variable. Information is stored in these systems by synapse conductance values. One popular prior art scheme for connecting neurons and synapses is depicted in FIG. 1. The network 10 is prompted by applying analog or digital signals to the input lines 12. This activates the neurons 14 and synapses 16 in the network 10. The degree to which a given neuron 14 is activated depends on the activation of the neurons 14 in the previous layer as well as the conductances of the weights leading to that neuron 14. After the system has settled, the output nodes 18 give the result. An electrical realization of such a prior art feedforward system is depicted in FIG. 2. The synapses 16 can be implemented as resistors and the neurons 14 as summers and threshold functions connected in series. Note that this configuration consists of three layers. The input layer, which can be as simple as a buffer or even a direct connection, is required to excite the first layer of synaptic elements. One or more hidden layers are required if the network 10 is to be capable of solving certain classes of problems. The output layer is required to sum the information from the hidden layer units, and possibly to threshold the resulting signals. Note that the number of layers, as well as the number of neurons 14 in each layer, are variables which must be selected by the neural network designer according to the task that the network 10 is to carry out.

While such a feedforward system can be used once the synaptic weights (i.e. conductances) have been set, a major consideration of neural network design is how to adjust these weights. A popular method of weight adjustment is the delta-backpropagation method. In this method, the network is trained by example. For a particular task, the network is repeatedly trained by applying representative input values and simultaneously applying the associated desired target output values to the network. A backpropagation system is then used to modify the weights such that the target output is more likely to occur given the applied input. Because the weights cannot be changed greatly during each backpropagation pass (otherwise previously stored information may be corrupted), many thousands or even millions of backpropagation training passes may be necessary to fully train such a network.

One prior art attempt at solving the problem addressed by the present invention employed VLSI capacitive elements for storing weights as voltages. This approach, of course, has the great disadvantage that the capacitances tend to discharge with time. Thus, the circuit has to be kept at a low temperature so as to minimize charge leakage. Even despite such precautions, however, the charges will dissipate slowly such that the weights represented by the capacitive charges need to be regenerated every day or two. This is intolerable for most application and, therefore, a more permanent storage of weighting values is highly desirable, such as that provided by resistive elements in other neural network applications. In this regard, however, perhaps the most serious obstacle to designing a practical DB processor is the lack of a suitable programmable resistive memory (RPM). Such memory elements, of course, are necessary to connect the various processing nodes of a neural network and store the information employed in the network. Among the required characteristics of such a PRM are high resistance, fast programmability, and non-volatility. While such devices have yet to go into actual production, work is well underway at the Jet Propulsion Laboratory (JPL) in Pasadena, Calif. and other research facilities with respect to the production of practical PRMs. Prototype PRM elements have been fabricated in prototype form using thin-film deposition techniques; and, while these devices are not yet fast enough to be used in a DB system, the advancements made to date suggest that memory elements with the required characteristics on a commercial basis may not be too far off.

STATEMENT OF THE INVENTION

Accordingly, it is an object of this invention to provide an analog implementation of the delta backpropagation algorithm within a neural network that lends itself to implementation in VLSI form.

It is another object of this invention to provided an analog implementation of a neural network employing delta backpropagation and which includes programmable resistive memory elements as the storage for the weighting values employed therein.

Other objects and benefits of the invention will become apparent from the description which follows hereinafter when taken with the drawing figures which accompany it.

BRIEF DESCRIPTION OF THE DRAWINGS

FIG. 1 is a simplified drawing depicting a typical feedforward neural network according to the prior art.

FIG. 2 is a simplified drawing showing an electrical implementation of the neural network of FIG. 1.

DETAILED DESCRIPTION OF THE INVENTION

The present invention as now to be described is intended to perform a modified delta-backpropagation (DB) algorithm in an analog, fully parallel manner using programmable resistive memory (PRM) elements and circuitry implementing DB equations such as those given by Rumelhart, Hinton, and Williams (Chapter 8, Volume 1, *Parallel Distributed Processing* Rumelhart and McClelland, eds., MIT Press, 1986), a copy of which is enclosed herewith. With the exception of the PRM devices, all circuit subsystems can be designed using standard CMOS VLSI techniques, including such subsystems as summers, thresholding circuits, and switching matrices.

Figure 3:
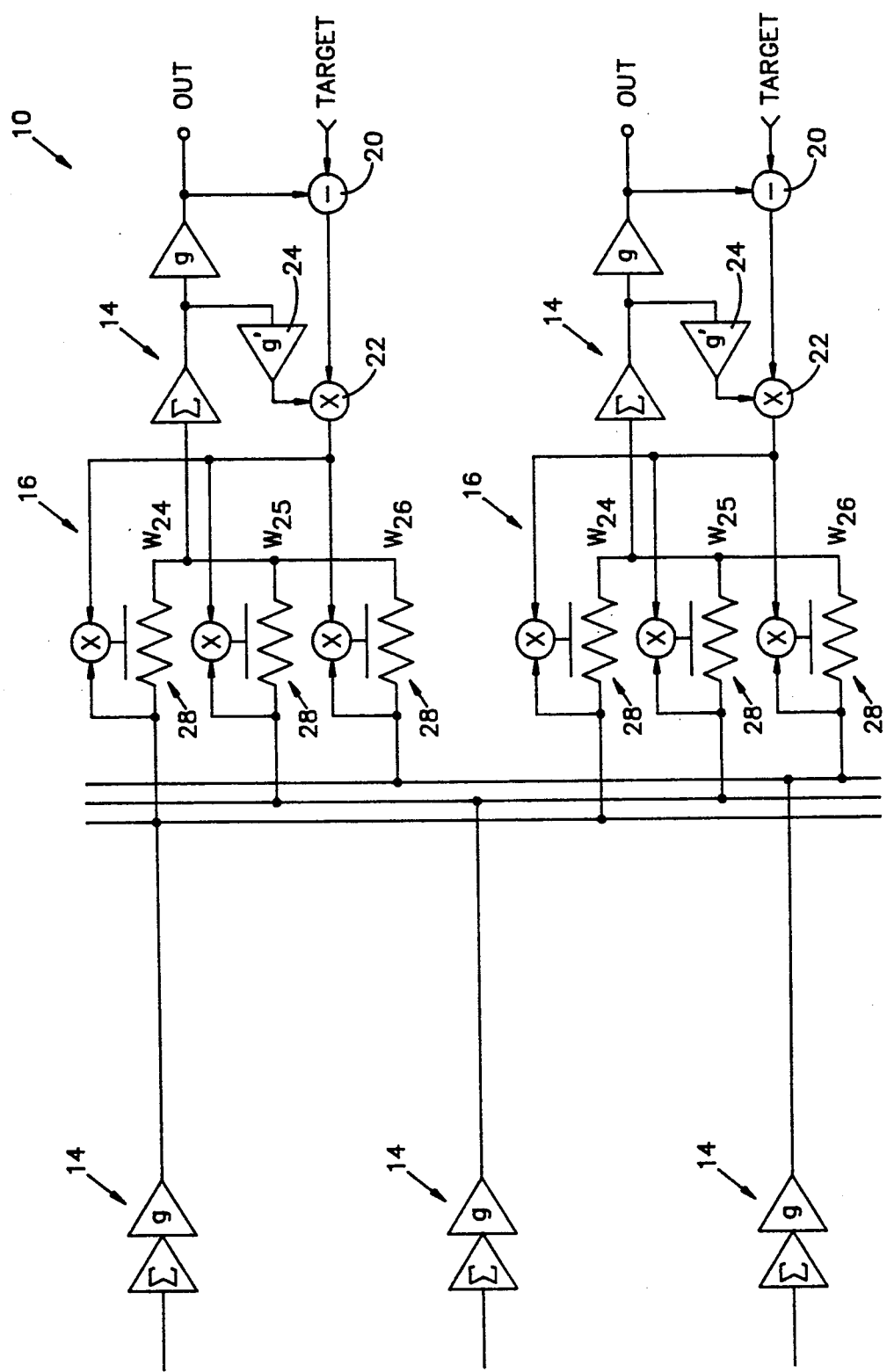
FIG. 3 is a simplified drawing depicting a delta-backpropagation neural network according to the present invention when backpropagating the error signal from the last stage.
Figure 4:
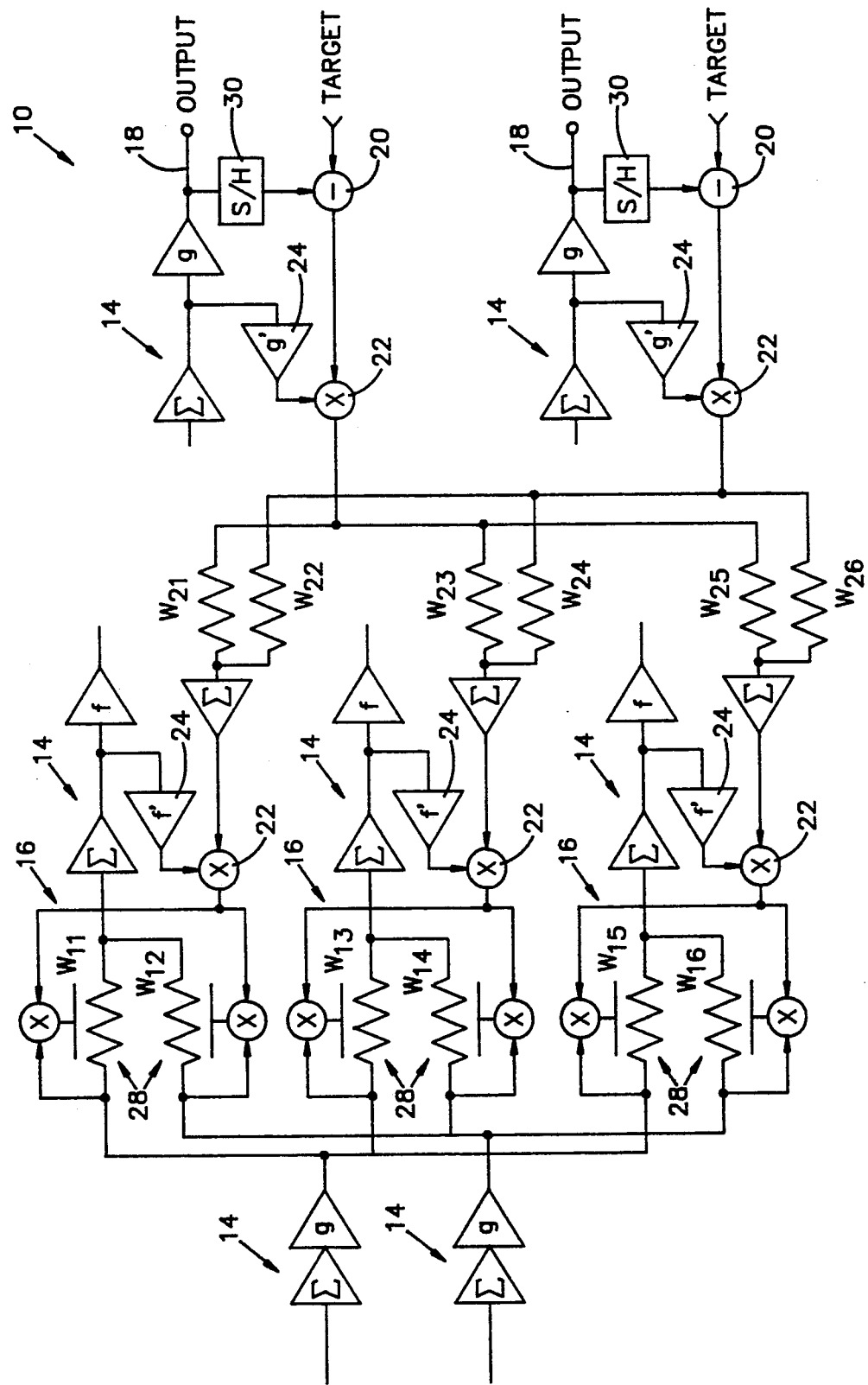
FIG. 4 is a simplified drawing depicting a delta-backpropagation neural network according to the present invention when backpropagating the error signal from other than the last stage.

Electronic implementation of a backpropagation approach to a neural network which could be implemented in VLSI logic posed an extremely complicated problem. One method according to the present invention is depicted in FIGS. 3 and 4. In the neural circuits depicted therein, the backpropagation is serially performed one layer at a time. The final synaptic layer is adjusted first (see FIG. 3). Feedforward is performed on one element of a training set and an error signal is calculated at 20 that is the difference between the actual output and the desired target value. This error signal is multiplied at 22 by the feedforward activation weighted by the derivative from 24 of the output activation function "g". For each weight that is connected to that output neuron 14, the error signal is multiplied at 26 with the output of the previous layer neuron 14, and the resultant product is used to adjust the weight represented by the PRM 28 by a small increment.

The backpropagation scheme for updating earlier synaptic layers is shown in FIG. 4. The error signal is backpropagated through the output synaptic layer and through the second synapses layer. Because this is likely to require that the output layer synapses be physically switched from the feedforward position to be backpropagation network, thus disabling the feedforward, the error signal (or output) must be stored (e.g., using a sample/hold or A/D and D/A converters at 30). The weights update then follows a form similar to that of the output layer—i.e., the backpropagated error for a specific synapse is multiplied by the activation of the neuron driving (in feedforward) that synapse, and this product is used to adjust the weight. Note that this procedure is recursive; that is, any number of hidden layers may be implemented by extending the foregoing scheme to more layers.

Figure 5:
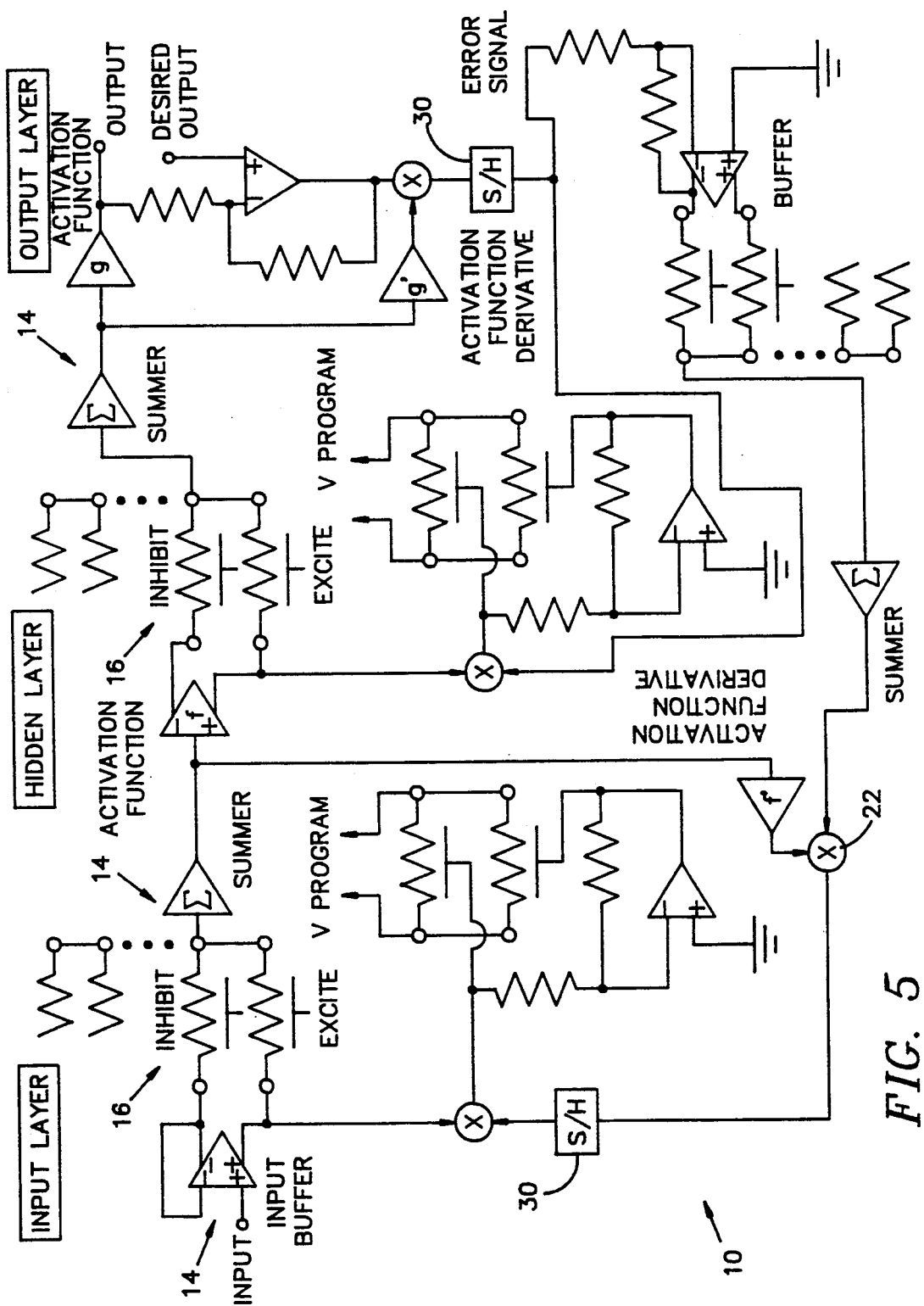
FIG. 5 is a more detailed circuit description of the present invention.

A more detailed circuit description of the present invention is shown in FIG. 5. For simplicity, only one neuron 14 and synapse is shown at each layer, for a total of three neurons 14 (the input buffer being counted as a neuron 14) and two synapses 16. Several points should be noted here. First, since the synaptic connection can be negative or positive (corresponding to inhibition or excitation), a differential scheme using two conductances is required (one may be fixed). These conductances are driven by signals of opposite polarity, so the ratio of the two conductances determines whether the synapses 16 will inhibit or excite. Second, the synapses 16 in this figure are shown in three different orientations. It should be stressed that the synapses 16 must be physically switched (by switching means well known to those skilled in the art which is not included in the drawings for sake of simplicity) from one orientation to another; that is, the same synapse positions (i.e. pair of programmable resistors) are used in each the three (or two in the case of the input layer) positions. In a first or "top" position, each synapse 16 is in the feedforward position. In a second or "center" position, the synapse 16 is reprogrammed based on the backpropagated error signal and the activation of the previous layer neuron 14. (Note, depending on synaptic structure, it may be possible to reprogram synapses 16 while they are connected in the feedforward circuit.) In a third or "bottom" position, the synapses 16 are used to form the backpropagated error signal required to reprogram synapses 16 in earlier layers.

As those skilled in the art will readily know and appreciate, a disadvantage of analog circuit components is their tendency to generate small error (offset) voltages. In a computer simulation by the invention herein, it was found that certain portions of the backpropagation circuits are sensitive to offset voltage drift. In particular, offset voltages can cause uncontrolled inflation of the weight values. Thus, it is important (and preferred) that the basic backpropagation algorithm be modified to take offset voltages into account. In the present invention, this is accomplished by applying a threshold to the backpropagated error signal such that the weights are not updated if the error voltage is below the threshold. If the threshold is set to the maximum expected offset voltage error, then uncontrolled weight inflation cannot occur; however, to insure that the system learns properly in all cases, it may also be necessary to alter the weights slightly when the error is below threshold. Simulations show that learning precision is improved by a very small fixed weight change in the direction that tends to cause a change of state in the neuron 14 following the weight.

It should be noted that the synapse programming circuit presented hereinbefore is by way of example and illustration of the present invention only and may differ from actual circuit designs as they will be dependent upon the synapse structure actually utilized in the final design.

Wherefore, having thus described my invention, what is claimed is:

1. In a neural computing network extending between at least one input on one end and at least one output on another end and comprising a plurality of neuron computational nodes interconnected by a plurality of synapse connections providing adjustably weighted paths between the neuron computational nodes, the improvement comprising:

each of the synapse connections including at least one programmable resistive memory element representing the weight to be accorded the associated synapse connection;

circuit means for implementing a modified delta-backpropagation algorithm and for adjusting said programmable resistive memory element of each of the synapse connections according to said algorithm as a function of an error signal representing the difference between an actual output value from the neuron computational node having the synapse connection as an input thereto and a target output value in response to a known input value applied to the input of the neural computing network; and means for comparing a threshold relating to resistance drift in said programmable resistive memory element with the error signal so that said programmable resistive memory element of each of the synapse connections is not updated as a function of said error signal if said backpropagated error signal is below said threshold.

2. The improvement to the neural computing network of claim 1 and additionally comprising:

means for setting said threshold to a maximum expected offset error whereby uncontrolled weight inflation associated with said programmable resistive memory elements cannot occur.

3. The improvement to the neural computing network of claim 2 and additionally comprising:

means for adjusting each of said programmable resistive memory elements by an amount representing a very small fixed weight change in a direction that tends to cause a change of state in the neuron computational node following said programmable resistive memory element in response to said backpropagated error signal falling below said threshold whereby learning precision of the neural computing network is improved.

4. The improvement to the neural computing network of claim 1 and additionally comprising:
a) each of the synapse connections including at least two programmable resistive memory elements representing the weight to be accorded the associated synapse connection;
b) means for applying an electrically positive signal through one of said programmable resistive memory elements representing excitation; and,
c) means for applying an electrically negative signal through another of said programmable resistive memory elements representing inhibition.

5. In a neural computing network extending between at least one input on one end and at least one output on another end and comprising a plurality of neuron computation nodes interconnected by a plurality of synapse connections providing adjustably weighted paths between the neuron computation nodes, the method of connection and operation for teaching the network comprising the steps of:
a) prior to teaching, including at least one programmable resistive memory element representing the weight to be accorded the associated synapse connection in each of the synapse connections;
b) at the time of teaching;
b1) applying a known input value to the input of the neural computing network,
b2) calculating error signals representing the difference between an actual output value from each neuron computational node having a synapse connection as an input thereto and a target output value in response to the known input value applied to the input of the neural computing network,
b3) using a modified delta-backpropagation algorithm to adjust the programmable resistive memory element of each of the synapse connections according to the algorithm as a function of an associated one of the error signals; and
c) comparing a threshold relating to resistance drift in said programmable resistive memory element with a backpropagated error signal and not updating the programmable resistive memory element of each of the synapse connections as a function of said error signal if said backpropagated error signal is below said threshold.

6. The method of claim 5 and additionally comprising the step of:
setting the threshold to a maximum expected offset error whereby uncontrolled weight inflation associated with the programmable resistive memory elements cannot occur.

7. The method of claim 6 and additionally comprising the step of:
adjusting each of said programmable resistive memory elements by an amount representing a very small fixed weight change in a direction that tends to cause a change of state in the neuron computational node following said programmable resistive memory element in response to said backpropagated error signal falling below said threshold whereby learning precision of the neural computing network is improved.

8. The method of claim 5 and additionally comprising the steps of:
a) prior to teaching, connecting at least two programmable resistive memory elements to each of the synapse connections representing the weight to be accorded the associated synapse connection;
b) at the time of teaching,
b1) applying an electrically positive signal through one of the programmable resistive memory elements to represent excitation, and
b2) applying an electrically negative signal through another of the programmable resistive memory elements to represent inhibition.

9. In a neural computing network comprising at least three layers extending between at least one input at a first layer and at least one output at a third layer, each of said layers comprising a plurality of neuron computational nodes, different layers being interconnected by a plurality of synapse connections providing adjustably weighted paths between the neuron computational nodes thereof, wherein the error signal is backpropagated through the output layer and through a second layer, the method of connection and operation for teaching the network comprising the steps of:
a) prior to teaching, connecting at least one programmable resistive memory element representing the weight to be accorded the associated synapse connection to each of the synapse connections;
b) at the time of teaching,
b1) applying a known input value to the input of the neural computing network,
b2) calculating error signals representing the difference between an actual output value from each neuron computational node having a synapse connection as an input thereto and a target output value in response to the known input value applied to the input of the neural computing network, and
b3) adjusting the programmable resistive memory element of each of the synapse connections according to a modified delta-backpropagation algorithm as a function of an associated one of the error signals wherein backpropagation is serially performed one layer at a time with the final layer being adjusted first by the following steps:
b3)i. performing feedforward on one element of a training set applied as predetermined inputs to nodes of said first layer,
b3)ii. calculating an error signal which is the difference between an actual output and a desired target value,
b3)iii. multiplying the error signal by a feed forward activation value weighted by the derivative of an output activation function,
b3)iv. for each programmable resistive memory element that is connected to an output neuron computational node, multiplying the error signal with the output of the previous layer neuron computational node,
b3)v. using the resultant product from the previous step to adjust the weight represented by the associated programmable resistive memory element by a small increment, b4) after the step of performing feedforward on one element of a training set, storing the error signal in a sample and hold apparatus; and b5) then physically switching the output layer synapse connections from a feedforward position to a backpropagation network to thus disable feedforward operation.

10. The method of claim 9 and additionally comprising the step of:

physically switching the synapse connections between a first or "top" position wherein each synapse connections is in a feedforward position, a second or "center" position wherein the synapse connection is reprogrammed based on the backpropagated error signal and the activation of the previous layer neuron, a third or "bottom" position wherein the synapse connections are used to form the backpropagated error signal required to reprogram synapse connections in earlier layers.

11. The method of claim 9 and additionally comprising the step of:

applying a threshold to a backpropagated error signal and not updating the programmable resistive memory element of each of the synapse connections if the backpropagated error signal is below the threshold.

12. The method of claim 11 and additionally comprising the step of:

setting the threshold to a maximum expected offset error whereby uncontrolled weight inflation associated with the programmable resistive memory elements cannot occur.

13. The method of claim 12 and additionally comprising the step of:

adjusting each of said programmable resistive memory elements by an amount representing a very small fixed weight change in a direction that tends to cause a change of state in the neuron computational node following said programmable resistive memory element in response to said backpropagated error signal falling below said threshold whereby learning precision of the neural computing network is improved.

14. The method of claim 9 and additionally comprising the steps of:

a) prior to teaching, connecting at least two programmable resistive memory elements to each of the synapse connections represented the weight to be accorded the associated synapse connection;

b) at the time of teaching, b1) applying an electrically positive signal through one of the programmable resistive memory elements to represent excitation, and b2) applying an electrically negative signal through another of the programmable resistive memory elements to present inhibition.

* * * * *